US008620972B1

(12) United States Patent
Ries et al.

(10) Patent No.: US 8,620,972 B1
(45) Date of Patent: Dec. 31, 2013

(54) RANDOM ORDER DIGITAL FILE FORMAT (76) Inventors: Ryan Ries, Tempe, AZ (US); Matthew Clark McFarland, Phoenix, AZ (US)

(*) Notice: Subject to any disclaimer, the term of this patent is extended or adjusted under 35 U.S.C. 154(b) by 0 days.

(21) Appl. No.: 13/357,100

(22) Filed: Jan. 24, 2012

Related U.S. Application Data (60) Provisional application No. 61/462,747, filed on Feb. 8, 2011.

(51) Int. Cl.
*G06F 17/30* (2006.01)
(52) U.S. Cl.
USPC .......................................................... 707/821
(58) Field of Classification Search
USPC ................................................ 707/821, 693
See application file for complete search history.

(56) References Cited

U.S. PATENT DOCUMENTS

| 7,689,633 | B1* | 3/2010 | Li et al. ........................ 707/821 |
| 8,005,801 | B2* | 8/2011 | Kazan et al. .................. 707/693 |
| 8,214,740 | B2 | 7/2012 | Johnson |
| 2010/0060493 | A1* | 3/2010 | Chen et al. .................... 341/58 |
| 2010/0306283 | A1* | 12/2010 | Johnson et al. ............... 707/803 |

* cited by examiner

*Primary Examiner* — Joshua Bullock

(57) ABSTRACT

A system for creating a random order file format, wherein randomization occurs at the sub-file level, the system having a data storage unit that stores a plurality of data pieces and at least one RODFF file that is created from said data pieces, where the RODFF files and data pieces are stored according to commands received by a software application; a microprocessor configured by the software application and operatively connected to the data storage unit whereby the microprocessor is configured to execute the software application and enable the RODFF files to be created, according to a set of predetermined methods from the plurality of digital data pieces, and also enables the RODFF files to be stored on and retrieved from the data storage unit.

1 Claim, 6 Drawing Sheets

RANDOM ORDER DIGITAL FILE FORMAT

This application claims the benefit of U.S. Provisional Patent Application Ser. No. 61/462,747, filed Feb. 8, 2011, the disclosure of which is incorporated in its entirety by reference herein.

BACKGROUND OF THE INVENTION

The present invention is related to the creation of new digital data files with new, randomized digital file formats.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIG. 1-6, the present invention features a random order digital file format ("RODFF") consisting of many discrete pieces of data and input files 110, that, using a predetermined Random Order Logic String 112, which is used by a Random Order Logic process 108, can be arranged into many unique cohesive streams of information, while being located in a single digital file, with the RODFF format 109.

RODFF files must consist of at least the information about the unique pieces of data 110, including the size and the starting point within the file of each piece, some logical information about the possible ways to recover the data into a stream, which is hereafter referred to as a "Random Order Logic String" (ROLS) 112, and all of the necessary data pieces required for every possible desired combination.

To create the RODFF file 109, a special encoder 107 can be used to combine all of the data pieces 110 and record the start location for each data piece 110 within a RODFF file 109 for later decoding 106. To use the RODFF file, a special decoder 106 can use the ROLS 112 created by the encoder 170 to reconstruct the discrete pieces of data 110 back into a useable information stream according to predetermined methods as defined of the Random Order Logic 108.

One possible application or embodiment of the present invention 101 is for use with audio data. An artist could use the present invention to record multiple sections, (data pieces or input files 110), that would all fit into the same location in the larger audio track or RODFF file 109. Data pieces 110 could also consist of a few different guitar solos. The software, upon playback, could randomly select one of the solos to play based on the information contained in the ROLS 112, so each time the user chooses to listen to the recorded song, a slightly different version is heard.

In some embodiments, data pieces for audio data are not confined merely to musical or guitar solos, but can also comprise any chosen section within a musical song or track. As such, said data pieces could be replaced with others, and are also not limited to equal lengths in time. In other words, a musical section that is replaced by another does not have to be replaced by one having an equivalent length.

Another possible use could be for text-to-speech, as a word along with all of its suitable synonyms could be recorded and stored as data pieces 110 in a single RODFF file 109, and upon playback a single synonym would be chosen at random and played back, giving a more human quality to artificial speech. There are of course many other possibilities, such as storing video or text in a similar manner, as well as any other information that can be digitized.

Referred to herein as the Random Order Logic String (ROLS) 112, the logical order with which to access the stored data in the RODFF file could be formed in many ways. One simple example is to use a string of characters, numbering each track for simplicity, and delimiting a random selection with some (non-numerical) character. For this example, the string "1 2,3 4" would represent a string of data that is made up of the first numbered piece of data, then either the second OR third piece of data (the comma here is representing a random choice), and finally the fourth piece of data. This results in two possible streams of information, chosen randomly by the Random Order Logic (ROL) 108, every time the RODFF file is accessed: "1 2 4", or "1 3 4". Of course, this logic system is a balance between easily human readable and easily machine readable; the selection could be made using named tracks to be more easily readable for humans, or for example using a binary referencing system to make it more direct (and faster) for a machine to make the logical choices. This logic system is also fairly simple, and could easily be extended allowing for much more complex logical patterns, by including things such as wild cards and sub-strings. Following the conventions laid out above, the string: "1 2,3,(4 5,7+ 6,7+ *) 8,9", where "0" denotes a sub-string, "+" denotes a logical "once" operation (the seventh track may be used either never or once, only where the track is marked with a "+"), and "h" denotes a wild card (where any available track is selected at random, including those marked with a "+"), allows for Many more complex logical streams. The Random Order Logic 108 would then read these characters and make a determination as to when and where to insert a random additional track as well as which tracks to select from at any given option. One possible output could be: "1 4 7 6 7 9". This logic may need to be tailored to the type of data being stored, or could be standardized across many forms of media; the provided examples are just one possible implementation.

The file format's physical structure on a digital storage medium or data storage unit 103, such as on a CD, hard disk drive, or a flash memory device, is rather flexible, depending on the desired use of the file. However, certain data is required for the file to function properly; it must include at least the ROLS, as well as the information required to correctly access the individual pieces of data 109 on the digital device.

Figure 1:
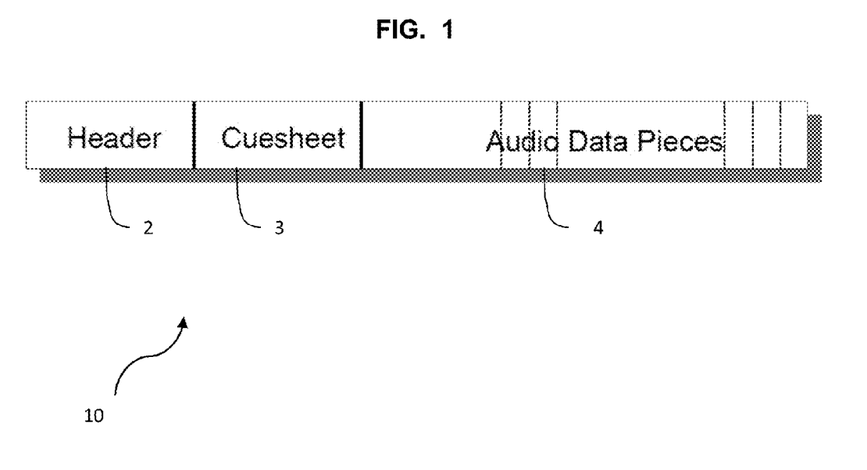
FIG. 1 shows a basic layout of a new file created with the random order digital file format, as could be used, in one embodiment, for audio files.

An example of a format for audio data is described in FIG. 1 10. The header 2 of this example audio data format contains the information used to play back the audio properly, such as bit rate, sample rate, number of channels, etc. as well as traditional meta-data describing the audio track, like track title, artist, track number, album title, or any other pertinent information, and in this case the header 2 also includes the ROLS used to access the audio data pieces 4, as described above.

A cuesheet 3, as used in an audio file 10 and shown in FIG. 1, is a device that can be used to record the position of each individual track within the file, which is already used to archive albums of audio data, and which can be re-purposed to record the position of the data pieces 4 within the file, regardless of the type of information being stored. This could be any other form of reference for the relative positions of the individual tracks of data within the file, however for the purposes of this example in FIG. 1. the traditional "cuesheet" 3 should suffice.

Finally, in an audio file embodiment, the actual audio data can be stored and stripped of any of the usual information required for playback, as this information is already stored in the header 2. For most types of data, the header 2 is most sensibly positioned at the start of the file, as this will be the first thing that the decoder 106 finds; this allows the decoder 106 to set up the proper parameters for playback as well as determine playback order without having to read the majority of the RODFF file 10. However, the order of these sections is not important; the header 2 and cuesheet 3 could come after the stored data, although on most digital systems this would require reading almost the entire file from its storage medium 103 to know what the system 100 should do with it.

The encoder 107 can be designed to be system independent, that is once the encoder 107 has done its job, regardless of the system on which the encoding is done, the resulting RODFF file can be transferred to any digital device with the software application 104 required to decode 106 the information and it should be decode-able. A reference for this type of file is the common ".mp3" audio file format, that can be played back on a plethora of devices from a standard desktop computer running Windows or Mac OS, to embedded devices such as oar stereo systems and cell phones. This will likely require standardization of the file format, structure or otherwise, for any given type of media (however it may be very different for two distinct types of data).

Figure 4:
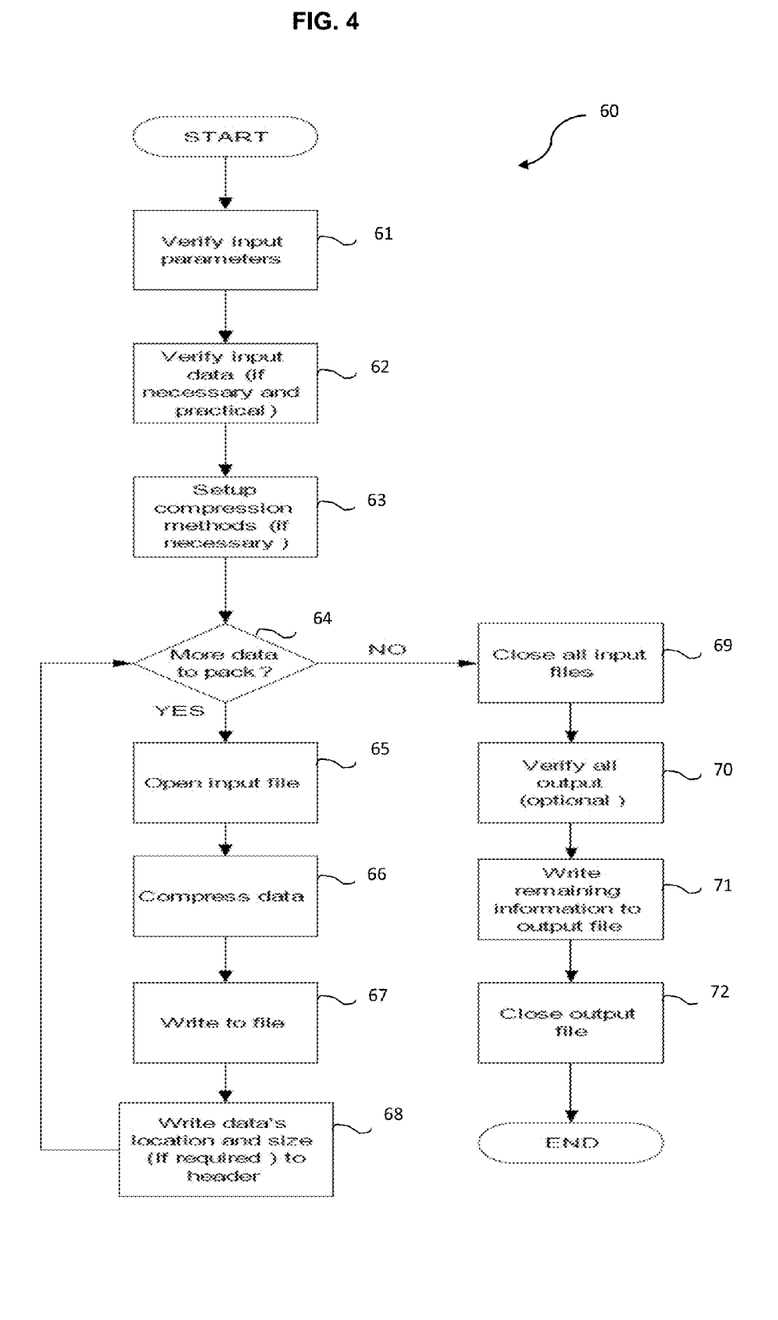
FIG. 4 shows a possible embodiment of the methodology for encoding and creating a new file with the random order digital file format.

FIG. 4. is a basic flowchart showing a generic encoder's process 60. The encoder 107 may also be designed to perform multiple tasks, such as the proper formatting of the information as well as data compression 105, as in the case of digital audio or video, as shown in this flowchart. However, this is not always strictly required; the main purpose of the encoder 107 is to combine multiple pieces of information 110 into one physical RODFF file 109.

Figure 2:
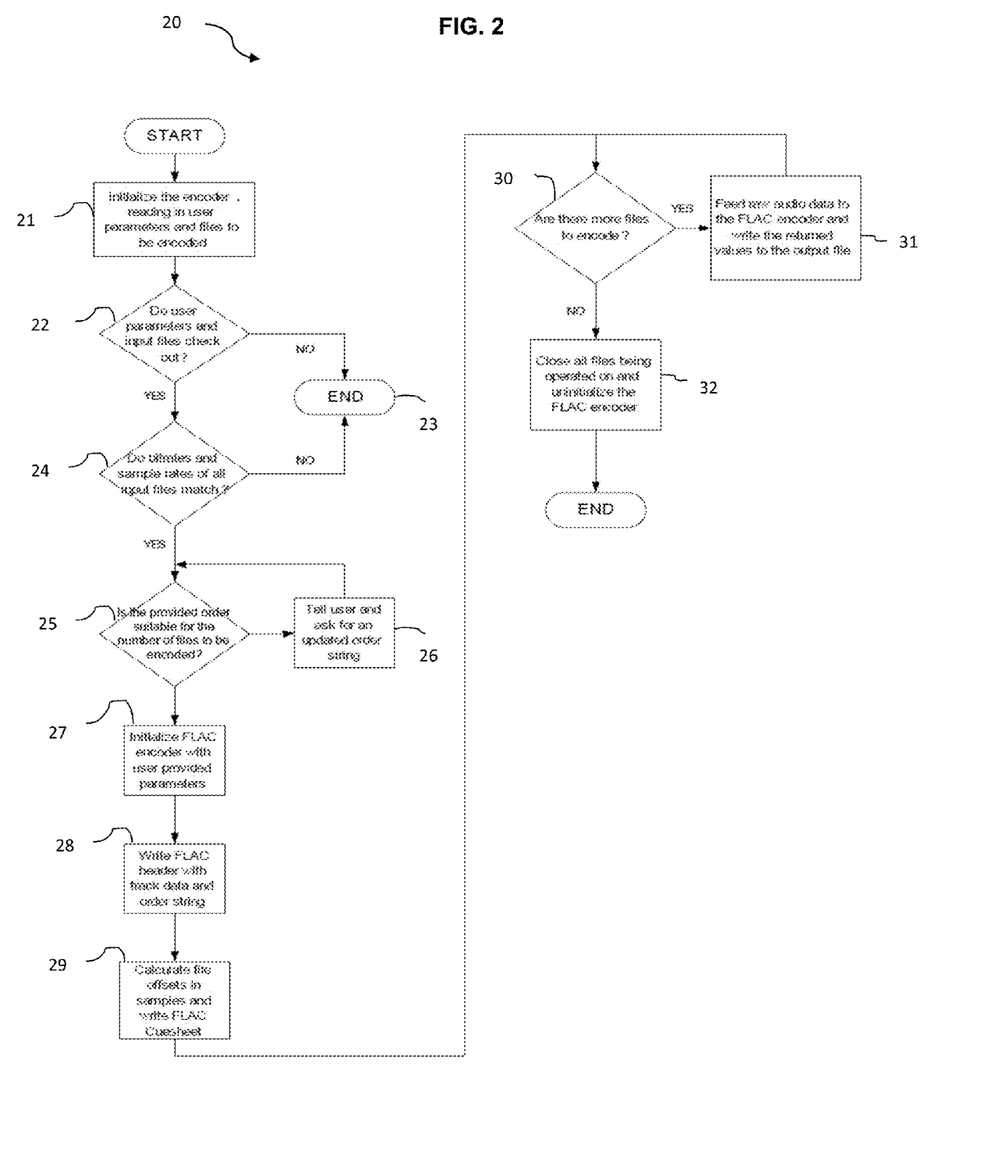
FIG. 2 shows one possible embodiment of a process flow where the invention is applied to audio data and utilizes the Free Loseless Audio Codec ("FLAC") compression method.
Figure 3:
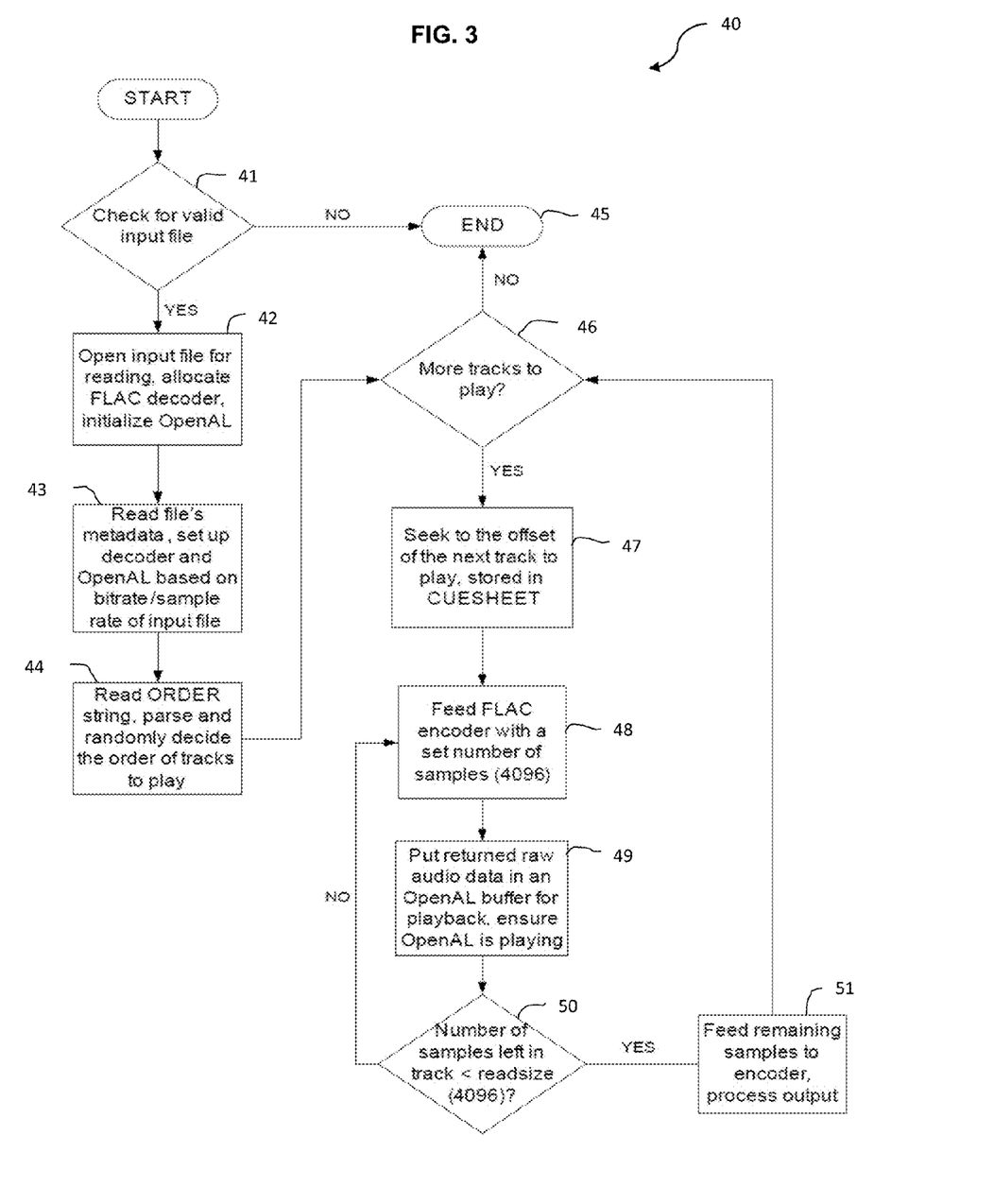
FIG. 3 shows one possible embodiment of a process flow where the invention is applied to audio data using the FLAC codec and the Open Audio Library ("OpenAL") audio system format.

Another possible encoder's process is diagrammed in FIG. 2 20. This encoder 107 uses the FLAC audio codec to compress 105 digital audio as it is being stored in the format that is outlined above.

The compression 105 codec or data storage conventions used are unimportant; any method suitable for the data being stored could be used and still get the full benefit from the logically determined random retrieval. For example, the MPEG-4 standard for video compression could be used in the case of video data, or a simple Huffman encoding scheme could be used for text data. Of course, no compression need be used, however this would likely result in a very large file size except for in the most simple cases.

As shown in FIG. 2, a basic operation of the encoder 107 is to verify that all of the input parameters are correct, such as a desired bitrate or sample rate for the audio output file to have, the level of compression 105 to use, and that all of the input files are valid audio data. The encoder 107 can then verify that each input audio file has matching bitrate and sample rates, however this is done for simplicity and does not have to be the case. It is possible to re-sample the audio data before encoding, as well as change the bitrate being used so that all of the data matches before being encoded and written to the output file. This encoder 107 also verifies the Random Order Logic String to be written as a FLAC comment into the file; this is not strictly necessary, as the ROLS can be modified at a later date as with audio meta-data, however it is useful to alert a user that something is not quite right before performing any (possibly very long) operation on the input data.

In some embodiments, encoders 107 designed to take advantage of the random order possibilities 108 will likely have multiple input data structures, and thus the key operation is combining these data structures into a single, easily accessible RODFF file 109.

In the encoder example using FLAC compression in FIG. 2 20, the encoder 107 loops through all of the input audio files 109, sends the data through the FLAC compression 105, and then writes the returned values to the RODFF output file, with no gaps between each file or markers to point to the data at all. It is possible, rather than using a cuesheet 113, to mark the start of each individual track within the data section for locating these sections upon decoding 106, however this will only help in situations where the data is easily search-able and the file cannot be read from any arbitrary position.

The physical order of the data in the container file is unimportant, as long as the Random Order Logic String 112 is updated accordingly. That is to say the data does not need to be stored in chronological order (or a similar method for other data); it should be able to be in any order and be accessed equally well.

The decoder 106 could have multiple functions, depending on the data being stored. In the audio example, the decoder 106 would likely extract the ROLS 112 and, using the Random Order Logic 108, select a unique order from the set of possible playback orders defined by the ROLS 112, then using the Cuesheet 113, locate the data files specified by the unique access order, decompress the stored data, and feed the raw audio samples to an audio system such as speakers or headphones according to said order. This is how the decoder 106 described by FIG. 3 operates 40, however the decoder 106 could also export all of the stored audio tracks into individual files, for example.

In the case of text, the decoder 106 could output to the screen, or to a simple text file, a specified number of "stories", using the logic to construct each individual information stream.

Figure 5:
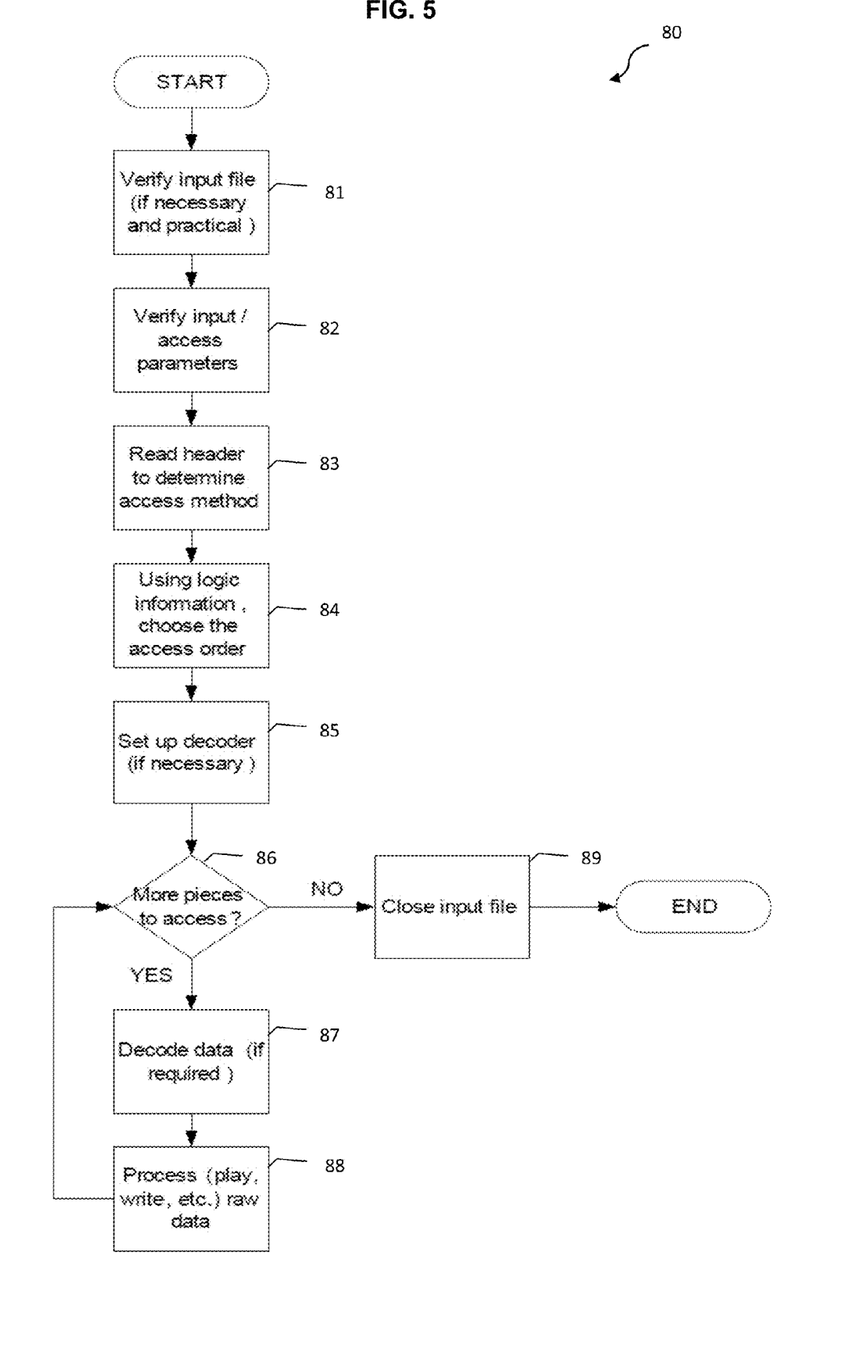
FIG. 5 shows a possible embodiment of the methodology for decoding and accessing a new file created with the random order digital file format.

Even though the function of the decoder 106 can be very different, the basic steps are the same (see FIG. 5 for a programmatic flowchart) 80:

Read the header file for the ROLS and cuesheet, where the cuesheet is stored as a separate data piece and acts as a table of contents for the stored data pieces, as well as any other necessary data to setup a decoder Determine the random order for this instance of accessing the data, using the Random Order Logic to select a specific instance out of the possible instances defined by the ROLS Using the Cuesheet, seek to the appropriate track, or audio data piece, and send the information through any decompression (if necessary), repeat this until the desired order is complete Perform any operation on the reconstructed data required (such as writing to a text file or playing through speakers)

Some of these operations may happen simultaneously, as in the example of the audio decoder an audio buffer can be filled in with the decoded data and have the audio playing back while the decoder works on more data.

There are many other ways this file format can be extended; in the case of audio, end users can pick a specific order of playback, store their favorite orders for playback later, and even share them with others. Producers and artists could update their music with new tracks, that are easily added to the current file by appending it to the end and updating the ROLS 112 in the header 111 of the file, similar to a software update.

The format could be easily extended to mobile devices designed for media playback, as it would be treated much like current media encoders and decoders. The format would also be a good candidate for replacing standard audio and video disc formats, since in addition to the random playback capabilities, compression can be used to store at least the same amount of data with no loss of quality, while using the same size discs.

A "data piece", 110 as used herein, is a piece of a larger data structure. Data pieces 110 are typically segmented at creation, completely separate, and not broken down from a single digital file. In the case of audio, one can think of each data piece as a variable length audio clip from a song (a second or two, to minutes, no time limit), not the whole song recorded in different ways multiple times.

Figure 6:
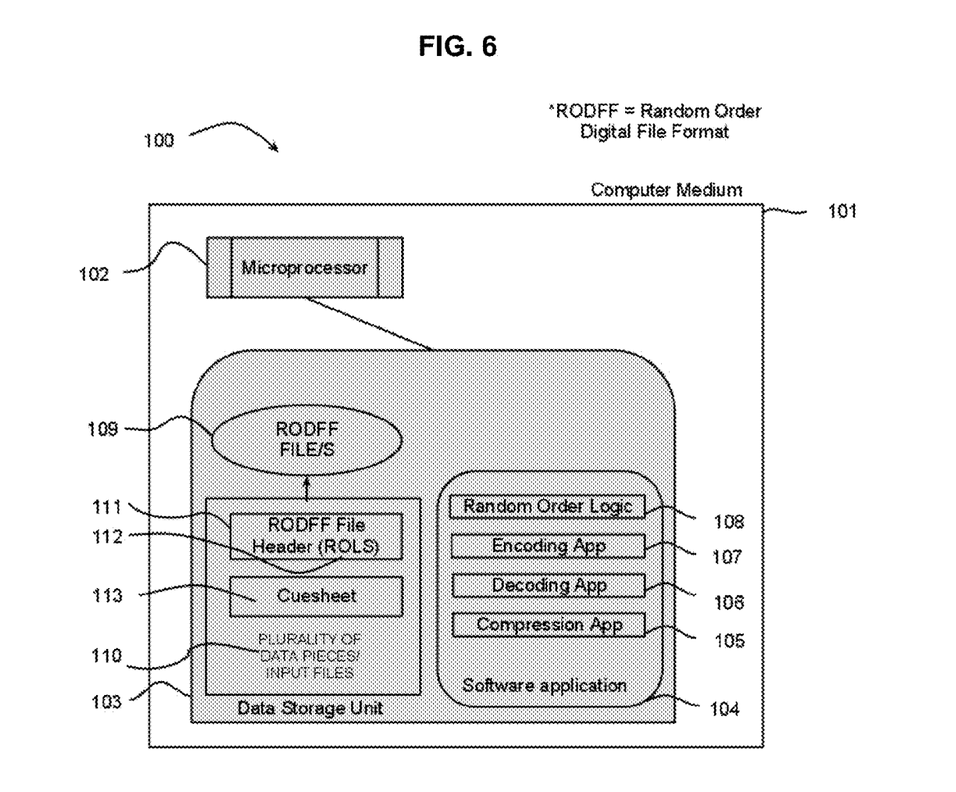
FIG. 6 shows a systems architecture of the present invention.

Although the terms "data piece" and "input file" are used interchangeably herein and in the Figures, because they are both potential building blocks of an RODFF file, a data piece does not necessarily equate to an input file. In other words, typically one input file would equate to one data piece, but there are also ways to denote separate pieces of data within a single data file, such as in the case of text "//" could indicate a split between data pieces within a single input file. Thus, it should be noted that a single input file may not always be a single data piece. FIG. 6 reflects the fact that RODFF files could be constructed from both input files and data pieces 110.

Each data piece 110 used is typically a fully functional file in its own right. For example, a data piece could comprise a Waveform Audio File Format ("WAV") audio file. To obtain an individual data piece 110, for example, in the case of audio files, information can be recorded separately and stored in an independent digital file.

The new RODFF files 109 are a new file type; not currently playable in any standard mp3 or piece of software capable of playing mp3s or other audio file formats. The RODFF files 109 contain a special structure that requires the decoding capability 106 built into the invention's software application 104. In some embodiments, this capability could be added to a next generation of music players and software applications, or possibly to existing software applications by distributing an audio codec capable of allowing the software to read the RODFF file structure.

Where figures discuss checking for bitrate and sample rates, the software application 104 is checking for compatibility between data pieces 110 for the target RODFF file 109. In some embodiments, where the software application 104 discovers incompatible data, the incompatible data could be excluded or the encoding process 107 could terminate altogether.

The RODFF file header 111, a separate data piece 110 in and of itself which contains the ROLS 112, is essentially a table of contents for the RODFF file 109. The file header 111 is created by the Random Order logic 108 implemented by the software application 104. By comparison the Cuesheet 113, located at a location defined in the RODFF header, is essentially a table of contents for the stored data pieces 110 inside the RODFF.

In varying embodiments, the Cuesheet 113, may be located inside the header, or may be treated as part of the file header. The location of the cuesheet inside the file is not important as long as the header knows where to look.

As show in FIG. 4 60, once an RODFF file is created, the RODFF file can be written to an output file which allows the contents of the file to be accessed by a RODFF decoder at a later point.

In some embodiments, each data piece 110, after being selected from an RODFF file 109, could be decompressed and placed in an output file, sent to an audio device to be played back on speakers, or decoded and displayed on a video screen. There are a variety of further applications for outputting the randomized information that would be known to one skilled in the art.

In some embodiments, the original, encoded file is left intact, and simply read from to generate the desired output, and then said output is immediately discarded after being presented to a user. This is similar to, for example, the output of information from an audio CD in a car. As soon as the information is read from the CD and played through the car speakers, the output information is discarded and only the original file forms exist on the CD.

One potential embodiment of the present invention is a system 100 for creating a random order file format, wherein randomization occurs at the sub-file level, the system 100 comprising:

a) a data storage unit 103 that stores a plurality of data pieces 110 and at least one Random Order Digital File Format ("RODFF") file 109 that is created from said data pieces 110, where the input data files 109 and data pieces 110 are stored according to commands received by a software application 104;

b) a microprocessor 102 configured by the software application 104, and operatively connected to the data storage unit 103 whereby the microprocessor 102 is configured to execute the software application 104 and enable the RODFF files 109 to be created from the plurality of data pieces 110 and also enables the RODFF files 109 to be stored on and retrieved from the data storage unit 103;

c) the software application 104, hosted on the data storage unit 103, where the software application 104 enables the microprocessor 102 to store, on the data storage unit 103, the RODFF files 109, where said RODFF files 109 are created from the plurality of digital data pieces 110, and also enables the microprocessor 102 to retrieve the RODFF files 109 in a useable format, according to predetermined methods, where said software application 104 contains code for executing the above tasks and random order logic 108;

d) at least one RODFF file 109, hosted on the data storage unit 103 and created from the plurality of data pieces 110 via the software application, 104 and the microprocessor 102, whereby said RODFF file 109 is created such that its contents are thereafter accessed according to the Random Order Logic String 112 identified in the file header 111 where said Random Order Logic String and file header are determined during a instance of a encoding application, where the file header also contains a Cuesheet 113, or a location for a Cuesheet 113, where the Cuesheet identifies the locations of each of the data pieces within the RODFF file 109;

e) the plurality of data pieces 110, hosted on the data storage unit 103, wherein said data pieces 110 are combined, via the software application 104 and the microprocessor 102, to create the RODFF data file 109;

f) a set of code instructions for the Random Order Logic 108, executed by the software application 104, which selects a unique access order instance, from the set of possible sequences defined by the Random Order Logic String 112, stored in a RODFF file header 111 of the RODFF file 109 which configures the RODFF file 109 to the random order file format when the decoding application is executed;

g) a set of code instructions for the encoding application 107, implemented by the software application 104, which enables the plurality of data pieces 110 to be consolidated and packed into the one single RODFF file 109, where the encoder determines, based on instructions selected by an original user, a Random Order Logic String 112, which determines the possible random orders in which the data should be played back, where the ROLS is placed in the file header 111 to be read by the decoding application 106 at playback time, where the encoder also creates a Cuesheet 113, which stores the locations of the plurality of data pieces within the file;

h) a set of code instructions for the decoding application 106, implemented by the software application 104, which enables the data pieces 11010 be unpacked from the RODFF file 109 and accessed for use, where the decoding application executes the Random Order Logic 108 and selects a unique access order based on the Random Order Logic String 112, where the decoding application then locates the data pieces selected by the unique access order from the memory locations identified by the Cuesheet 113, where the data pieces are then sent to the compression algorithm 105 to be decompressed i) a set of code instructions for compression application 105, utilized by the software application 104, which enables compression and decompression of the data pieces 110 and/or RODFF file 109;

j) the file header 111 comprising a separate data piece 110 located within the RODFF file 109, where the file header 111 identifies the Random Order Logic String 112 contained in the RODFF file 109;

k) a cuesheet 113 which may be located in the file header, or may comprise a separate datapiece identified in the file header, where the cuesheet identifies the locations of the plurality of data pieces 110 within the RODFF file 109;

whereby the system 100 encodes, via the encoding application 107, and creates, from the plurality of data pieces 110, the single RODFF file 109. In addition, one of said data pieces 110 comprises the file header 111 created by the software application 104. The file header 111 identifies a Random Order Logic String 112, as defined by the software application 104, where the Random Order Logic String 112 defines a set of possible sequences in which data pieces 110 are accessed and decoded 106 from the RODFF file 109. The system 100 also stores the single RODFF file 109 on the data storage unit 103, and retrieves the single RODFF file, using the decoding application 106, whereby the decoding application 106 reads the Random Order Logic String 112 from the file header 111, and executes the Random Order Logic 108, which selects a unique order for accessing the data pieces in the file, whereby the decoding application then selects and decompresses the individual data pieces in the file according to the unique order.

In some embodiments, the information comprising the system may be stored on a computer-readable medium 101, as code instructions for the software which are stored in the data-storage unit 103, which may be executed by the microprocessor 102.

As used herein, the "sub-file level" refers to manipulation of a data file at the data piece level, or manipulating the building blocks of a whole data file.

As used herein, "pre-determined methods" refers to the process by which the Random Order Logic application is preconfigured as discussed in Paragraph 15.

Although the preferred embodiment, as shown herein, places the Random Order Logic during in the decoding application, other embodiments could execute the Random Order Logic in the encoding application such that RODFF Files are randomly generated from the start of the process.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system for creating a random order file format, wherein randomization occurs at the sub-file level, the system comprising:

a data storage unit that stores a plurality of data pieces and at least one Random Order File Format (RODFF) file, that is created from said data pieces, where the RODFF files and data pieces are stored according to commands received by a software application;

a microprocessor, configured by the software application, and operatively connected to the data storage unit whereby the microprocessor is configured to execute the software application and enable the RODFF files to be created, according to a set of predetermined methods, from the plurality of digital data pieces and also enables the RODFF files to be stored on and retrieved from the data storage unit;

the software application, hosted on the data storage unit, where the software application enables the microprocessor to store, on the data storage unit, the input data flies, where said RODFF files are created from the plurality of digital data pieces and also enables the microprocessor to retrieve the RODFF files in a useable format according to predetermined methods, where said software application contains code for executing the above tasks and Random Order Logic;

at least one RODFF file, hosted on the data storage unit and created from the plurality of data pieces via the software application, and the microprocessor, whereby said RODFF file is created such that its contents are thereafter accessed according to the Random Order Logic String (ROLS) identified in the file header where said Random Order Logic String and file header are determined during an instance of a encoding application, where the file header also contained a Cuesheet, or a location for a Cuesheet, where the Cuesheet identifies the locations of each of the data pieces within the RODFF file;

the plurality of data pieces, hosted on the data storage unit, wherein said data pieces are combined, via the software application and the microprocessor, to create the RODFF data file;

a set of code instructions for the Random Order Logic, executed by the software application, which selects a unique access order instance, from the set of possible sequences defined by the Random Order Logic String, stored in a RODFF file header of the RODFF file which configures the RODFF file to the random order file format when the decoding application is executed;

a set of code instructions for the encoding application, implemented by the software application, which enables the plurality of data pieces to be consolidated and packed into the one single RODFF file, where the encoder determines, based on instructions selected by an original user, a Random Order Logic String, which determines the possible random orders in which the data should be played back, where the ROLS is placed in the file header to be read by the decoding application at playback time, where the encoder also creates a Cuesheet, which stores the locations of the plurality of data pieces within the file;

a set of code instructions for the decoding application, implemented by the software application, which enables the data pieces to be unpacked from the RODFF file and accessed for use, where the decoding application executes the Random Order Logic and selects a unique access order based on the Random Order Logic String, where the decoding application then locates the data pieces selected by the unique access order from the memory locations identified by the Cuesheet, where the data pieces are then sent to the compression algorithm to be decompressed;

a set of code instructions for compression application utilized by the software application, which enables compression and decompression of the data pieces by the encoder into an RODFF file;

the file header comprising a separate data piece located within the RODFF file, where the file header identifies the Random Order Logic String contained in the RODFF file;

a cuesheet which may be located in the file header, or may comprise a separate datapiece identified in the file header, where the cuesheet identifies the locations of the plurality of data pieces within the RODFF file;

wherein the system encodes, via the encoding application, and creates, from the plurality of data pieces, the single RODFF file;

wherein one of said data pieces comprises the file header created by the software application;

wherein the file header identifies a Random Order Logic String, as defined by the software application, where the Random Order Logic String defines a set of possible sequences in which data pieces are accessed and decoded from the RODFF file; and wherein the system also stores the single RODFF file on the data storage unit, and retrieves the single RODFF file, using the decoding application, whereby the decoding application reads the Random Order Logic String from the file header, and executes the Random Order Logic, which selects a unique order for accessing the data pieces in the file, whereby the decoding application then selects and decompresses the individual data pieces in the file according to the unique order.

\* \* \* \* \*